Figure 3:
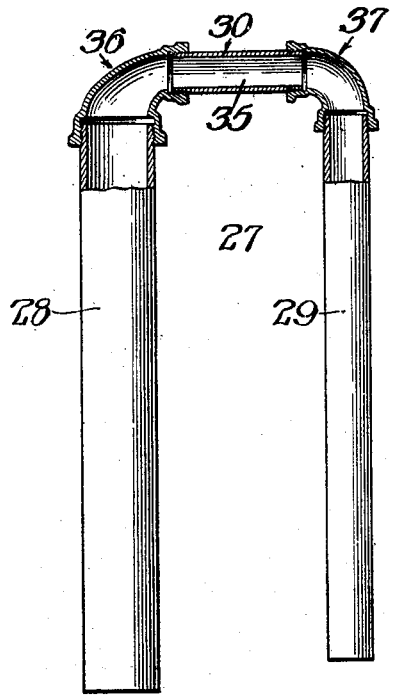

S. F. MILLER.
PIPE SIPHON.
APPLICATION FILED FEB. 24, 1908.
903,395.
Patented Nov. 10, 1908.
2 SHEETS—SHEET 1.
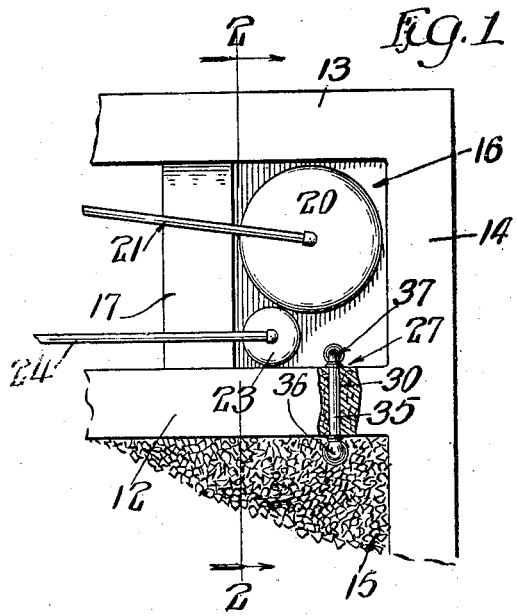
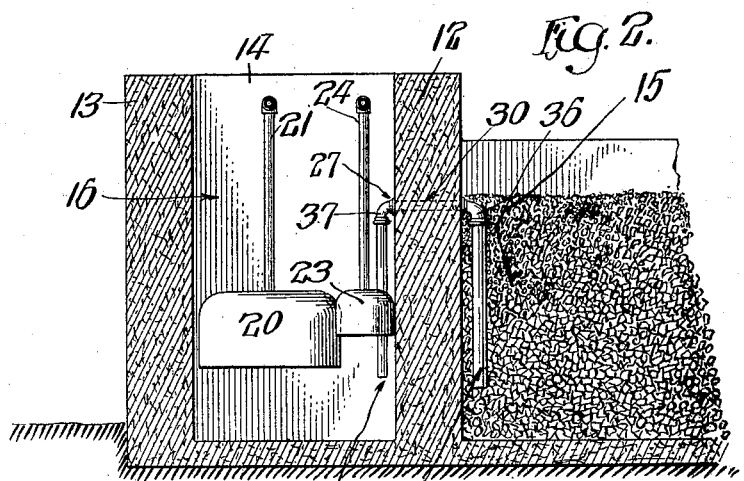
Witnesses:
F. H. Alfeds
G. M. Campbell
Inventor
Samuel F. Miller
by Poole + Brown
Attys

S. F. MILLER.
PIPE SIPHON.
APPLICATION FILED FEB. 24, 1908.

903,395.

Patented Nov. 10, 1908.
2 SHEETS—SHEET 2.

Witnesses:

Inventor
Samuel F. Miller
by Poole & Brown
Attys

UNITED STATES PATENT OFFICE.

SAMUEL F. MILLER, OF CHICAGO, ILLINOIS.

PIPE-SIPHON.

No. 903,395.   Specification of Letters Patent.   Patented Nov. 10, 1908.

Application filed February 24, 1908. Serial No. 417,263.

*To all whom it may concern:*

Be it known that I, SAMUEL F. MILLER, a citizen of the United States, and a resident of Chicago, in the county of Cook and State of Illinois, have invented certain new and useful Improvements in Pipe-Siphons; and I do hereby declare that the following is a full, clear, and exact description thereof, reference being had to the accompanying drawings, and to the letters of reference marked thereon, which form a part of this specification.

This invention relates to a novel pipe siphon for filling and discharging receptacles under circumstances where a receptacle of smaller dimensions is to be filled from and afterwards discharged into a tank or receptacle of larger dimensions.

One practical adaptation of my invention is found in an apparatus for distributing liquid sewage from a septic tank to the filter beds of a sewage purifying plant of the general character shown in the prior United States Letters Patent to Adams, Number 648,325, granted April 24th, 1900. In the system disclosed in said patent the liquid sewage is fed from a distributing chamber alternately to two or more filter beds, and automatic air lock feed devices are employed to control the delivery of the sewage to said filter beds in such manner that when the feed flow is cut off from one filter bed the air lock feed device of another filter bed is opened to permit the flow of the sewage to another filter bed. In the construction shown in the said prior Adams patent, the air lock feed devices are controlled to lock and release the same by means of air pressure transmitted thereto through two downwardly opening bells or domes in each filter bed and pipes connecting said domes with the air lock feed devices; one dome in each filter bed communicating through its pipe with the feed device of its associated bed and the other dome or bell communicating through its pipe with the feed device of another filter bed, whereby, upon the rise of liquid in the filter bed and around the open lower ends of said domes, the air imprisoned in said bells is transmitted under pressure to the air lock feed devices to control the same in the manner set forth in said Adams patent.

The system in connection with which my novel pipe siphon may be used differs from the prior Adams construction in that the domes referred to are located in small chambers, termed "compression chambers", which are located adjacent to and receive liquid from the filter beds, said chambers being filled from the filter beds through the pipe siphons herein shown as the filter beds are filled, and being discharged through said pipe siphons as the filter beds are emptied. The said compression chambers are located at the level of the filter beds and the filling and discharging pipe siphons each comprise an ascending and a descending limb, one of which communicates at its lower end with the filter bed and the other of which communicates at its lower end with the interior of the compression chamber, said limbs being connected at their upper ends by a transverse bend. For convenience of description, the limb which communicates with the filter bed is hereinafter termed the filling inlet limb and the limb which communicates with the compression chamber is termed the filling discharge limb, said terms having reference to the direction of flow of the liquid through the pipe siphon when the compression chamber is being filled.

The object of the present invention is to improve the construction and operation of such filling and discharging pipe siphons so as to prevent accumulation of air therein in a manner tending to interfere with the proper action of said device when it operates as a siphon to empty the contents of the compression chamber into the filter bed, or in a generally similar manner operates to empty any other receptacle which is filled through the same siphon device.

This invention consists in the matters hereinafter set forth and more particularly pointed out in the appended claims.

Figure 4:
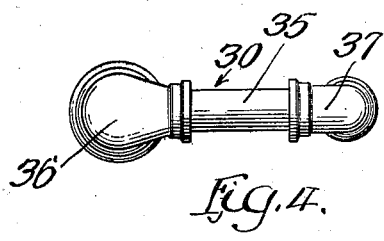
Figure 6:
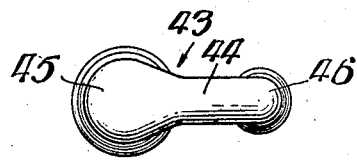
Figure 5:
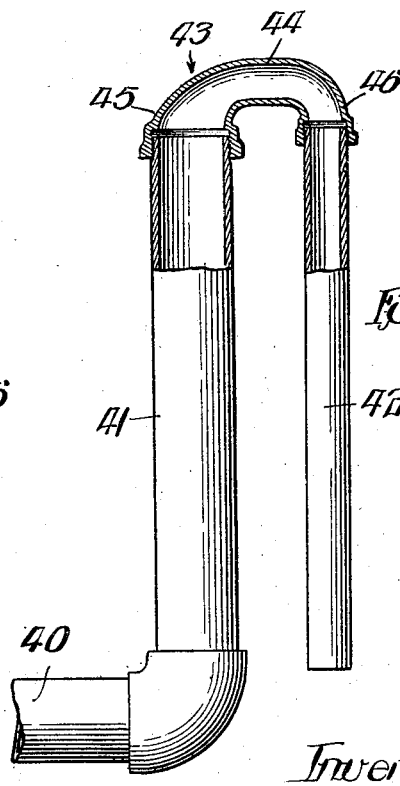

As shown in the drawings:—Figure 1 is a top plan view of a compression chamber of the character referred to, showing also an associated filter bed and part of the distributing chamber by which liquid is distributed to the filter beds of the system. Fig. 2 is a vertical section, taken on line 2—2 of Fig. 1. Fig. 3 is a vertical section of the filling and discharging siphon pipe illustrated in Figs. 1 and 2. Fig. 4 is an enlarged plan view of the reducing elbow of the siphon shown in Figs. 1 and 2. Fig. 5 is a partial vertical section and partial elevation of a modified form of pipe siphon. Fig. 6 is a top plan view of the siphon shown in Fig. 1.

As shown in the drawings, 12 and 13 designate the side walls and 14 one of the end walls of a distributing chamber, and 15 designates a filter bed which receives liquid from the distributing chamber through the air lock feed devices referred to, but not herein shown.

16 designates one of the compression chambers of the system located, as herein shown, at one end of the distributing chamber and inclosed by the end wall 14 and side walls 12 and 13 of the distributing chamber, and a wall 17 extending transversely between said side walls 12 and 13. Contained within said compression chamber is a downwardly opening bell or dome 20 which is closed at its top. Said dome is provided with a pipe 21 which communicates at one end thereof with the interior if the bell through its top wall and is designed for connection at its other end with the air lock feed device of the associated filter bed. Contained also within said compression chamber is a smaller bell or dome 23 provided with a pipe 24 which is designed to extend to and communicate with the air lock feed device of another filter bed. The said pressure transmitting domes and their pipes and the air lock feed devices constitute no part of the present invention and general reference has been made thereto only for the purpose of indicating a practical use of my novel pipe siphon in connection therewith. The said compression chamber communicates with the filter bed through the medium of a pipe siphon 27, shown in place in Figs. 1 and 2 and in detail in Figs. 3 and 4, and in which is embraced my present invention. The siphon pipes shown in said figures comprise two vertical limbs 28 and 29 open at their lower ends, and a transverse portion 30 which connects the upper ends of said limbs. The limb 28, herein termed the inlet filling limb, is located within the filter bed adjacent to the wall 12, separating the compression chamber and filter bed and is in open communication at its lower end with the filter bed. The filling discharge limb 29 of said siphon pipe is located on the other side of said wall within the compression chamber and is in open communication at its lower end with said chamber. The transverse portion 30 connecting the upper ends of said limbs extends through said wall 12.

When the filter bed has filled to the level of the transverse portion or bend of the siphon, the liquid flows from the filter bed through said siphon into the compression chamber and fills said compression chamber to the same level as the filter bed is filled. As the liquid rises in said compression chamber around the downwardly opening domes therein, air pressure is transmitted to the air lock feed devices of the filter beds in the same manner as in the construction of the prior Adams patent referred to and arrests the further flow of liquid to one filter bed and starts the flow of liquid to another filter bed. The compression chamber is emptied through said pipe siphon when the associated filter bed is emptied. If the compression chamber be filled to a height to submerge the transverse connecting portion or bend of the siphon, the beginning of the emptying operation of the compression chamber through the siphon is effected by gravity. After the liquid level in the compression chamber reaches a point below the bend of the siphon the continued flow of the liquid through said siphon is effected by a siphon action, such action continuing until the lower end of the leg in the compression chamber is uncovered. It will be noted that said latter limb of the siphon terminates below the level of the bells or domes, thus insuring that the level of the liquid in the chamber after the emptying operation shall be below the level of said domes.

In accordance with my invention, the internal diameter of the siphon is decreased at a point between the upper end of the filling inlet limb 28 and the inlet discharge limb 29, and such decrease of diameter is preferably made in the transverse connecting portion or bend 30 of the siphon closely adjacent to the upper end of the inlet filling limb. The diameter of the siphon at this place is such as to insure that the highest part of the siphon, the place where air is likely to accumulate, shall be entirely filled during the inflow of liquid through the siphon to the compression chamber, whereby all of the air from the upper part of the siphon is driven or swept from the siphon ahead of the liquid passing to the compression chamber. It is found in practice that if the transverse portion or bend of the siphon be made of the same diameter as the limb thereof which leads from the filter bed, air confined in the upper part of the siphon will not be displaced or swept therefrom by the liquid unless the liquid shall rise in the filter bed so rapidly as to produce a rapid movement of a large body of liquid through the siphon, this being a condition which seldom obtains in the case of filter beds of large area or capacity. It is found, moreover, that when the rise of the water in the filter bed is slow, giving only a slight flow or "dribble" of liquid through said siphon, the liquid may not fill said transverse portion or bend and may not, therefore, completely displace or sweep the air from the siphon. If a body of air remains in the upper part or bend of the siphon after the compression chamber has been filled, it will interfere with the subsequent siphoning action of the device when the compression chamber is to be emptied therethrough, and thereby renders the action of the siphon unreliable.

In the form of the siphon pipe shown in Figs. 1 to 4, inclusive, the upper transverse portion or bend of the siphon comprises a horizontal pipe section 35 and two elbows 36, 37, the former joining said pipe section 35 with the upper end of the filling inlet limb 28 and the latter joining said horizontal section with the filling outlet or discharge limb 29. The said connecting pipe 35 and the filling outlet discharge limb 29 are shown in said last mentioned figures as made of the same diameter and of less diameter than the filling inlet limb, and the reduction of diameter of the siphon takes place in the elbow 36, said elbow constituting a reducing elbow. The full diameter of the filling inlet limb is carried into the reducing elbow 36 approximately to the level of the dam or weir formed by the bottom or floor of the section 35 of the siphon bend, and from this point the elbow diameter is rapidly decreased until it reaches the smaller diameter of the transverse section 35. As a result of this feature of construction, a relatively slight rise of water in the larger filling inlet limb will furnish so large a volume of water to the adjacent horizontal part of the pipe, of smaller diameter, as to completely fill the latter. The filling outlet limb of the siphon may be made of greater diameter than the horizontal portion 35 of the siphon inasmuch as effective sweeping or clearing of the air from the siphon takes place in the reduced highest portion thereof. It is preferable, however, to make the filling outlet limb of the siphon of the same diameter as the transverse portion or bend thereof; this construction rendering more certain the discharge of all of the air with the moving body of liquid. The said upper transverse portion of the siphon may be made of any required practicable length commensurate with its proper operation as a siphon. A considerable elongation of said transverse or horizontal portion is advantageous inasmuch as the friction of the liquid against the surrounding walls of the pipe as the liquid flows through or along said horizontal or transverse portion thereof has a tendency to retard the flow and thereby insure that the horizontal portion will be completely filled by the liquid entering the same from the filling inlet limb, and any air therein from the upper part of the siphon.

In Fig. 5 I have shown a form of siphon in which the entire device is designed to be contained within the compression chamber and is adapted to be connected at its lower end by a pipe 40 with the filter bed. In said figure, 41 and 42 designate, respectively, the filling inlet limb and the filling outlet limb of the siphon, the former made larger than the latter and connected at their upper ends by a transverse portion 43 comprising a single or integral cast fitting. Said fitting consists of a horizontal portion 44 and two downwardly turned end portions 45, 46 which are internally screw-threaded to receive the upper screw-threaded end of the limbs 41 and 42. The end of said connecting fitting which communicates with the larger limb of the siphon is made substantially like the reducing elbow of the previously described construction, it carrying the full internal diameter of the limb 41 to approximately the level of the floor or bottom of said fitting and rapidly decreasing in diameter from said point to the smallest diameter of the horizontal portion of the fitting.

It will be understood that the filling and discharging pipe siphon herein described may be employed wherever it is desired to fill a receptacle with liquid and subsequently discharge the same through the same passage to the receptacle or space from which the liquid flowed to fill such receptacle. It is to be understood, furthermore, that a siphon embodying the principles of operation described and designed for the use referred to may assume forms varying from those herein illustrated, and I do not wish to be limited to the structural details described, except as hereinafter made the subject of specific claims.

I claim as my invention:—

1. The combination with a receptacle to be filled and emptied and a second receptacle from which liquid is drawn to fill said first receptacle and into which the contents of said first receptacle is discharged, of a filling and discharging siphon connecting said receptacles and through which liquid flows by gravity from the second to the first receptacle to fill the latter, said siphon having a filling discharge limb which opens at its lower end into the first receptacle and a filling inlet limb which opens at its lower end into the said second receptacle, said limbs of the siphon being connected at their upper ends by a transverse portion or bend the internal area of which is materially less than that of the filling intake limb of the siphon.

2. The combination with a receptacle to be filled and emptied and a second receptacle from which liquid is drawn to fill said first receptacle and into which the contents of said first receptacle is discharged, of a filling and discharging siphon connecting said receptacles and through which liquid flows by gravity from the second to the first receptacle to fill the latter, said siphon having a filling discharge limb which opens at its lower end into the first receptacle and a filling inlet limb which opens at its lower end into the second receptacle, said limbs of the siphon being connected at their upper ends by a transverse portion or bend, the internal diameter of which is substantially less than that of the filling intake limb of the siphon, the full diameter of said filling intake limb extending approximately to the level of the floor of said transverse portion or bend.

3. The combination with a receptacle to be filled and emptied and a second receptacle from which liquid is drawn to fill said first receptacle and into which the contents of said first receptacle is discharged, of a filling and discharging siphon connecting said receptacles and through which liquid flows by gravity from the second to the first receptacle to fill the latter, said siphon having a filling discharge limb which opens at its lower end into the first receptacle and a filling inlet limb which opens at its lower end into the second receptacle, said limbs of the siphon being connected at their upper ends by a transverse portion or bend, the internal diameter of said connecting portion or bend and the filling outlet limb being substantially less than that of the filling intake limb of the siphon.

4. The combination with a receptacle to be filled and emptied and a second receptacle from which liquid is drawn to fill said first receptacle and into which the contents of said first receptacle is discharged, of a filling and discharging siphon connecting said receptacles and through which liquid flows by gravity from the second to the first receptacle to fill the latter, said siphon having a filling discharge limb which opens at its lower end into the first receptacle and a filling inlet limb which opens at its lower end into the said second receptacle, said limbs of the siphon being connected at their upper ends by a transverse portion or bend, said transverse portion or bend being made of substantially horizontal length and of less internal diameter than that of the filling inlet limb of the siphon.

In testimony, that I claim the foregoing as my invention I affix my signature in the presence of two witnesses, this 15th day of February A. D. 1908.

SAMUEL F. MILLER.

Witnesses:
C. CLARENCE POOLE,
G. R. WILKINS.